June 13, 1950 U. S. DUNN 2,511,050
DUAL WELDER

Filed March 24, 1947 8 Sheets-Sheet 1

INVENTOR.
Ulysses S. Dunn
BY Strauch & Hoffman
attorneys

June 13, 1950 U. S. DUNN 2,511,050
DUAL WELDER
Filed March 24, 1947 8 Sheets-Sheet 2

INVENTOR.
Ulysses S. Dunn
BY *Strauch + Hoffman*
attorneys

June 13, 1950  U. S. DUNN  2,511,050
DUAL WELDER
Filed March 24, 1947  8 Sheets-Sheet 3
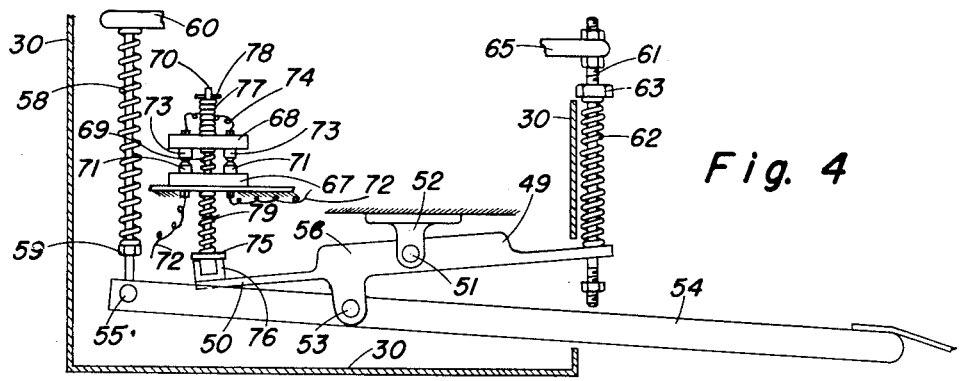
Fig. 4
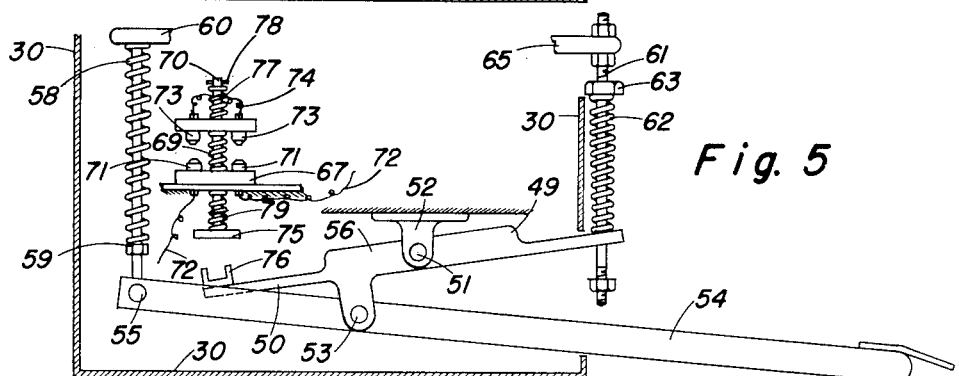
Fig. 5
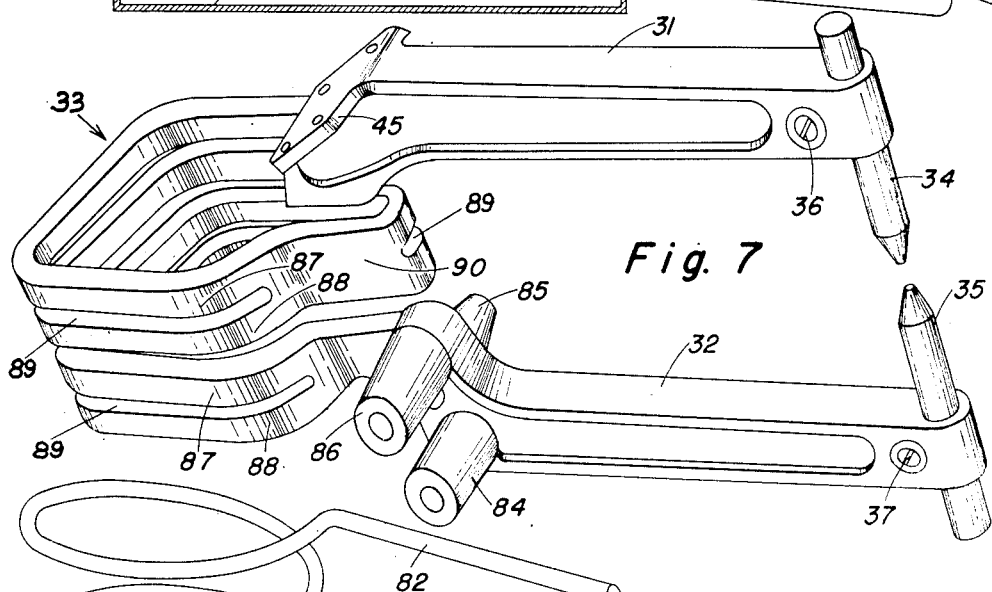
Fig. 7
Fig. 6
INVENTOR.
Ulysses S. Dunn
BY Strauch & Hoffman
attorneys June 13, 1950

U. S. DUNN 2,511,050

DUAL WELDER

Filed March 24, 1947

INVENTOR.
Ulysses S. Dunn
BY Strauch & Hoffman
attorneys

June 13, 1950  U. S. DUNN  2,511,050
DUAL WELDER
Filed March 24, 1947  8 Sheets-Sheet 6

INVENTOR.
Ulysses S. Dunn
BY Strauch & Hoffman
attorneys

Patented June 13, 1950

2,511,050

UNITED STATES PATENT OFFICE 2,511,050

DUAL WELDER

Ulysses S. Dunn, Milwaukee, Wis.

Application March 24, 1947, Serial No. 736,689

15 Claims. (Cl. 219—4)

This invention relates to improvements in welding apparatus, and particularly to a unit which is especially arranged to be selectively used for either spot welding or arc welding operations.

Welding units intended to be used either as spot welding or as arc welding units have been previously known, as exemplified by the disclosure in the Patent No. 1,506,698, issued to Charles B. Waters. I have, however, provided a new and improved welding unit which can be selectively used either for spot welding or for arc welding and with full efficiency in either case. My improved unit provides means for obtaining a continuously variable output current between the maximum and minimum limits when using the unit either as a spot welder or as an arc welder. If desired, the spot welding elements can be eliminated and the unit used solely for arc welding. On the other hand, if it is known that the unit is to be used only for spot welding, those elements which are alternately used only for arc welding may be eliminated so that there can be a corresponding decrease in the cost of manufacture of the unit if it is to be used for only a single purpose, although with my novel and improved construction the entire unit, which can be used for either type of welding, will normally cost only from 50 to 70 percent of the combined cost of two independent units of conventional design and intended to be used solely for spot welding and for arc welding purposes.

The improved unit includes a novel actuating lever system for applying the spot welding pressure to the work pieces between the electrodes and for initiating and terminating the welding current at the proper time after the welding pressure is applied and before it is released. A novel switch is included in this system and is adapted to be used selectively to give a short impulse of current for spot welding operations or to be continuously closed to afford a steady supply of current for arc welding operations. When used as a spot welder, full adjustments are provided to allow the machine to handle various thicknesses of work, to vary the welding current, to control the welding pressure, and to control the length of time of application of the welding current. When used as a spot welder, the efficiency of the unit is increased by the use of an integral spot welding secondary coil and electrode holding arms, the secondary coil being resilient so as to return to its initial position with the electrodes separated after the spot welding operation is completed. By making the spot welding secondary and the electrode holding arms in one piece, a considerable gain in efficiency is effected because of the fact that there are no electrical joints between the secondary coil and the electrode arms. One of the features which makes my unit particularly adaptable for use either as a spot welder or as an arc welder is a novel form of transformer which has two relatively fixed secondary coils which are selectively used for spot welding or arc welding operations, there being a movable primary coil which cooperates with the two aforesaid secondary coils in all positions to provide a continuous variable output current in either secondary when the unit is being used as a spot welder or an arc welder.

In addition to the movable primary coil in the transformer, I have effectively increased the range of control of current output in either the spot welding secondary or in the arc welding secondary, by using adjustably positionable shunt cores which are movable with respect to the fixed shunt cores attached to the transformer core together with the movable adjustable primary coil.

While it has been known to provide a single welding transformer with both spot welding and arc welding secondaries, as exemplified in the Patent No. 1,506,698 to Charles B. Waters, and it has also been previously known to provide a continuously variable welding transformer by moving one of the transformer coils with respect to the other, as exemplified by the disclosure in the Patent No. 2,283,712 to A. U. Welch, Jr., so far as I know it has not previously been proposed, prior to my invention, to provide a movable primary coil in a welding transformer which is movable with respect to two fixed secondary coils to provide a continuously variable output of either arc welding or spot welding current, nor has it previously been proposed to extend the range of adjustment provided by the movable primary coil by at the same time shifting relatively movable shunt cores within the fixed cores of the transformer.

It is therefore the primary object of my invention to provide a new and improved welding unit which can be selectively used for either spot welding or for arc welding purposes.

It is also an important object of my invention to provide a new and improved transformer for a combined spot welding or arc welding unit and which will afford a continuous variation in the output current of either the spot welding portion or the arc welding portion of the unit.

It is also an important object of my invention to provide a novel welding transformer which will give a continuously variable welding current whether the transformer is used in a spot welder or in an arc welder.

Another object of my invention is the provision of a novel control lever and electric supply switch combination which will insure the proper sequential application of welding pressure, current supply and cut-off, and release of the welding pressure, so that proper spot welds will be made without burning of the work pieces or of the spot welding electrodes.

It is another object of my invention to provide in a combined spot welding and arc welding unit, a novel switch mechanism and lever system which can be selectively used to apply a short, properly timed supply of current to the work pieces when used as a spot welder, or to supply a continuous welding current when used as an arc welder.

Another important object of my invention is the provision of a novel unitary integral secondary coil combined with electrode holding arms so that there results a minimum of loss of current between the spot welding secondary and the electrodes carried by the electrode arm.

Another object of my invention is the provision of a novel combined spot welding secondary and integral arrangement of electrode arms to provide a minimum of electric losses between the secondary and the electrodes held by the arms, wherein the secondary coil is sufficiently resilient to allow the electrode arms to be moved towards each other to enable the electrodes to engage and press the work pieces together and to disengage the electrodes and return them to their open position after the spot weld is completed.

Other objects will become apparent as the description proceeds in connection with the attached drawings wherein:

Figure 4 is a partial view similar to Figures 2 and 3 but showing the relative positions of the lever system when the current switch is closed;

Figure 5 is a partial view similar to Figure 4 showing the relative positions of the lever system after the current switch has been opened;

Figure 6 is a schematic representation of a two turn spot welder secondary having integral electrode arms, in accordance with my invention;

Figure 7 is a perspective view of a two turn spot welder secondary having integral electrode arms, of the type shown schematically in Figures 2, 3 and 6, and in accordance with the illustrative working embodiment shown in Figures 10 to 14;

Figure 1:
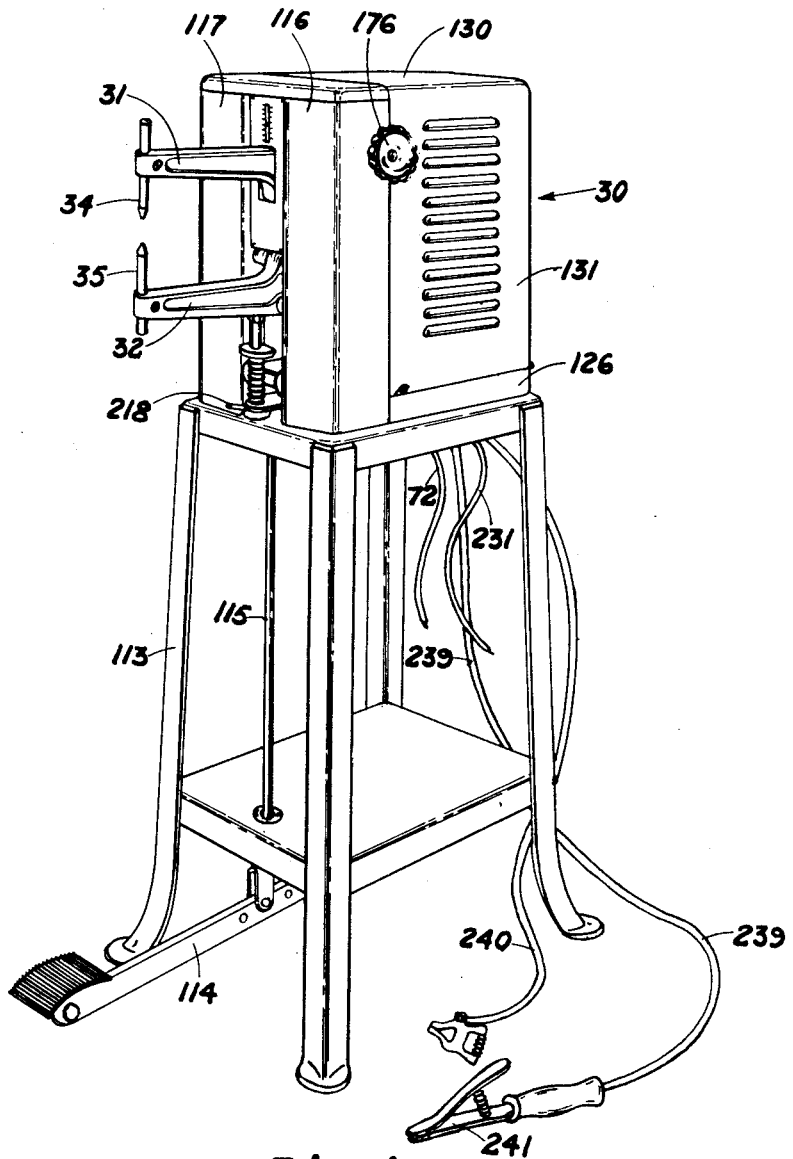
Figure 1 is a perspective view of a welder embodying my invention.

Referring to the drawings, several important phases of the invention are described and shown schematically in Figures 2 to 9, inclusive.

Figures 2 to 5 are a schematic representation of the lever and operating switch mechanism of the spot welder of Figure 1. In these figures, as in Figure 1, a cabinet 30 houses portions of the operating lever mechanism, the transformer, and the operating switch. Protruding from the front of the cabinet are a top electrode arm 31 and lower electrode arm 32, which form the integral ends of a two-turn spot welding secondary coil 33, as will be described. Upper and lower electrodes 34 and 35 are adjustably secured at the outer ends of the upper and lower arms 31 and 32 by clamping devices 36 and 37, respectively. The lower electrode arm 32 is secured and insulated at three points 38 to a fixed support 39 within the cabinet 30, so that the lower arm 32 has a fixed position and supports the secondary coil 33 and the integral upper electrode arm 31. As will be explained later, there is sufficient resiliency within the secondary coil 33 to allow the upper electrode arm 31 to be forcibly moved downwardly from the open position of Figure 2 to the clamping position of Figure 3 wherein a pair of work pieces 40 and 41 are clamped between the electrodes 34 and 35 so that they can be spot welded.

At 42 is indicated a fixed housing lying in a vertical transverse plane within the cabinet 30 for a transformer core (not shown). A lever 43 is pivotally mounted upon the housing 42, as indicated at 44. At its forward end, the lever 43 is affixed to a flange 45 on the inner end of the upper arm 31, as by screws 46. The pivot 44 is located in a transverse vertical plane which bisects the secondary coil 33, and at the midpoint of the vertical dimension of the coil 33. At its rear end, the lever 43 has a pivoted connection 47 to the upper end of a push-rod 48.

A pressure lever 56 having a forward leg 49 and a rear leg 50 is pivotally mounted at 51 to a fixed support 52 within the cabinet 30. The rear leg 50 of the pressure lever has a pivotal connection 53 to a pedal lever 54, the lever 54 also having a pivotal connection at 55 to the lower end of the push-rod 48. A compression or return spring 58 is mounted upon the push-rod 48 and compressed between an adjustable nut 59 on the push-rod and a member 60 which is fixed with relation to the cabinet 30. At the end of the forward leg 49 of the pressure lever 56, a pressure spring rod 61 has a sliding connection therewith, as by passing through a hole in the leg 49. The upper end of the rod 61 is fixedly clamped to a bracket 65 fixed with respect to the cabinet 30. A welding pressure compression spring 62 is mounted upon the rod 61 and compressed between the leg 49 of lever 56 and an adjustable nut 63 threaded onto the rod 61. The position of the nut 63 upon the rod 61 is indicative of the force with which the work pieces 40 and 41 are clamped between the electrodes 34 and 35, as will be explained, and for that reason a scale 64 (Figure 12 only) is mounted in a fixed position with respect to the cabinet and indicates the clamping force or welding pressure by reading the position of the nut 63 with respect to the scale.

Figure 2:
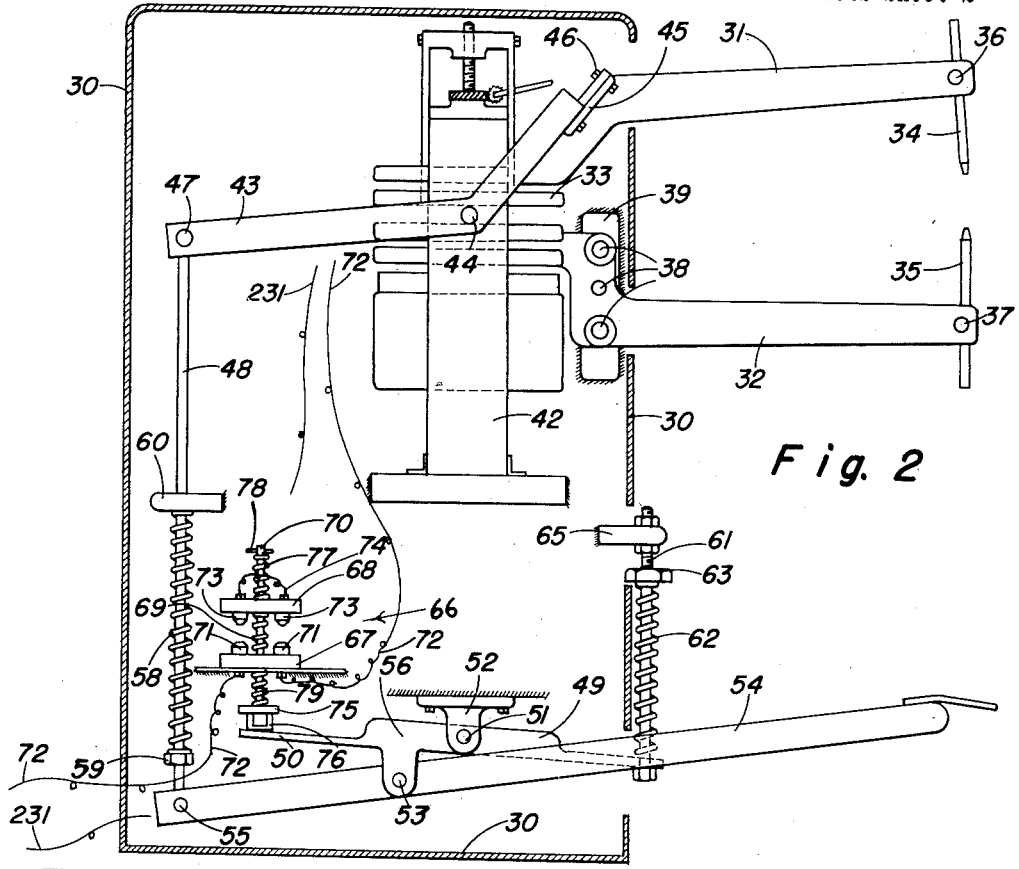
Figure 2 is a schematic view of the operating lever system and switch mechanism of the spot welding portions of the welder of Figure 1, the machine being shown with its electrodes fully separated to allow work to be inserted therebetween.

The rear leg 50 of the pressure lever 56 is arranged to actuate a switch 66 in the primary circuit of the transformer that is mounted within the housing 42. As shown in Figures 2 to 5, the switch 66 includes an insulating support member 67 fixedly mounted within the cabinet 30 in a position substantially over the end portion of the rear leg 50 of the pressure lever 56. A second insulating support member 68 is suitably mounted for guided movement towards and away from the member 67 by means which will be shown in the detailed drawings, Figures 10 and 15. A compression spring 69 on a central rod 70 urges the insulating support member 68 to its upward position in which it is shown in Figure 2.

The insulating support member 67 carries a pair of electrical contacts 71 which are connected in series to an electrical lead 72 in one side of the circuit from the power supply source, and the other contact 71 is connected to one side of the transformer primary. The other lead 231 from the power supply source is connected to the other side of the transformer primary. The second or upper support member 68 carries a pair of contacts 73 which are connected together by a lead 74. It will be apparent that when the support member 68 is pushed downwardly so that the mating contacts 71 and 73 are in engagement, the circuit to the primary of the transformer will be completed, and a spot welding current will be supplied by the secondary coil 33 through the electrode arms 31 and 32 to the electrodes 34 and 35.

The rod 70 has a sliding connection through the insulating members 67 and 68, and has on its bottom a pole piece 75 for engagement with the poles of a magnet 76 on the rear leg 50 of the pressure lever. A compression spring 77 on the top end of the rod 70 between the insulating member 68 and a stop pin 78 urges the rod 70 and the pole piece 75 upwardly with respect to the insulating member 68. Thus the compression spring 77 will permit a further downward movement of the rod 70 after the pairs of contacts 71 and 73 have come into engagement. Only a limited amount of such relative downward movement of the rod 70 is permitted by the spring 77, however, before its coils are compressed against each other and stop further relative movement of the rod. During operation of the spot welder, the rod 70 will be pulled to the bottom of its stroke by the magnet 76, and continued movement downward of the magnet 76 will release the pole piece so that the rod 70 and the upper contacts 73 will spring upwardly under the influence of springs 69 and 77. A third spring 79 is mounted on the rod 70 between the pole piece 75 and the fixed insulating support member 67, and serves as a buffer to cushion the upward movement of the aforesaid elements after their release by the magnet.

The operation of the spot welder is shown in its sequential steps in Figures 2–5. The function of the return spring 58 is to push the push-rod 48 downwardly so as to counter-balance and raise the pedal lever 54 to its highest position and at the same time return the upper arm 31 to its open position. The resilience of the secondary coil 33 assists in this by holding the electrode arms open as in Figure 2 and the adjustment provided by nut 59 assists in returning arm 31 to a definite position. The electrodes 34 and 35 have been adjusted in the upper and lower electrode arms 31 and 32 so that the arms are approximately parallel when the electrodes 34 and 35 close upon the work as they are in Figure 3.

Figure 3:
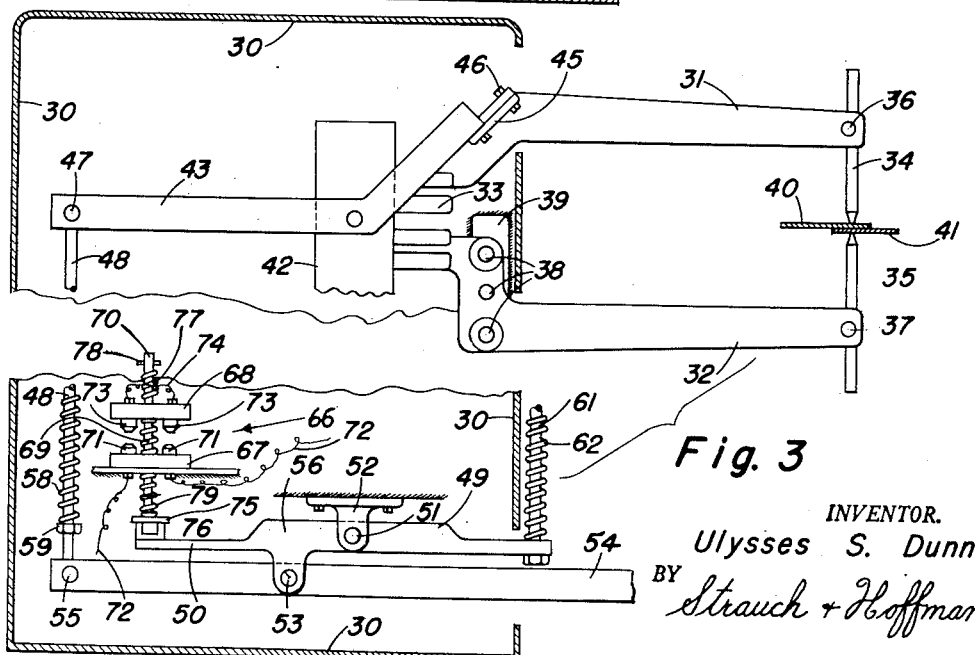
Figure 3 is a view similar to Figure 2, showing the work clamped between the electrodes but with the current still off.

Figure 2 therefore shows the position of the spot welder when it is at rest. It will be seen that the pedal lever 54 is in its extreme upward position at its forward end. The electrode arms 31 and 32 are comparatively widely separated. The pressure of the return spring 58 has been adjusted by the nut 59 so as to hold the system in the position shown in Figure 2. The pressure lever 56 is urged in a clockwise direction by the pressure spring 62, which has been adjusted by the nut 63 to apply the proper welding pressure to the work pieces 40 and 41. The switch contacts 71 and 73 are separated so that no current is being supplied to the welder. Figure 3 shows the relative position of the parts when the lever 54 has been manually depressed through about half of its total stroke so as to bring the electrodes 34 and 35 against the work pieces 40 and 41. Once this position has been reached, there can be no further rotation of the lever 43 in a clockwise direction except a very slight movement due to the natural spring in the parts as the pressure against the work piece is increased, as will be described. Since the push-rod 48 has therefore reached the end of its upward stroke, the pivot 55 at its bottom becomes a fixed pivot about which the lever 54 rotates during its further downward movement. When the pedal lever has been depressed to the position shown in Figure 3, the pressure lever 56 has been rotated counterclockwise slightly so as to slightly compress the pressure spring 62 and to pull the upper contact 73 slightly downwardly, although they have considerable more distance to move before they engage the lower contacts 71. However, spring 62 may have been so adjusted by the nut 63 as to prevent any appreciable movement of lever 56 up to this point, so that the pivot 53 has been a fixed pivot up to this point, depending on the relative pressure of spring 62 as compared to spring 58 in relation to their lever ratios.

Since the pivot 55 has now become a fixed point, Figure 4 shows the relative positions of the parts when the pedal lever 54 has been further depressed towards the bottom of its stroke. In Figure 4, the contacts 71 and 73 have just engaged so as to close the circuit to the transformer primary through the leads 72 and 74 by closing the switch 66.

While the lever system has been moving from the position of Figure 3 to the position of Figure 4, the pressure lever 56 has been rotated counterclockwise so as to compress the welding pressure spring 62. The force applied by the forward leg 49 of the pressure lever to compress the spring 62 is transmitted back through the lever system to the electrodes 34 and 35 so as to apply the intended welding pressure to the work piece between the electrodes before the welding current is turned on. The pressure applied by the electrodes to clamp the work piece between them is thus a function of the ratio of the lever system, the strength of the spring 62, and the position of the pressure adjusting nut 63 on the rod 61. The relative strengths of the return spring 58 and the pressure spring 62 are such that there is comparatively little if any compression of the pressure spring 62 while the return spring 58 is being compressed during the upward movement of push-rod 48 to close the electrodes against the work, and the counterclockwise rotation of the pressure lever carrying the magnet during this phase of the operation of the machine has been exaggerated in Figure 3 for illustrative purposes.

By the described lever and switch system, the proper welding pressure has been applied to the work pieces to clamp them together between the electrodes before the welding current is supplied by the engagement of the contacts 71 and 73, and with the described system there is no way for this welding current to be supplied until the proper welding pressure is applied to the work pieces to clamp them together.

Because of the fact that the pressure lever carrying the magnet does not start to move to compress the pressure spring 62 or to close the switch 66 until the work pieces have been clamped by the electrodes, the welding pressure is always duplicated at the weld within rather wide limits of electrode spacing and weld thickness.

Thus it is impossible for the current to be supplied to the electrodes until they have closed on the work pieces with a predetermined pressure. The welding current is supplied to the electrodes and then disconnected while the pedal lever 54 is being manually depressed from the position of Figure 4 to the position of Figure 5. Once the contacts 71 and 73 are engaged as they are in Figure 4, the magnet 76 continues to pull the pole piece 75 and the rod 70 downwardly because the rod 70 can slide vertically with respect to the insulating support member 68 as previously described. However, the rod can only be moved down in this manner until it is stopped by the closing of the coils of the spring 77 against each other as also previously described. For this reason, while the magnet 76 is moving to the bottom of its stroke to the position shown in Figure 5, the spring 77 will become "solid" and stop the movement of the pole piece 75 to cause it to separate from the magnet 76 as the magnet continues its downward movement. Once separation has occurred, the spring 69 is sufficiently strong to snap the contact 73 upwardly to open the circuit to the transformer primary and thus discontinue the welding current.

It is pointed out that while the pedal lever 54 is being depressed from the position of Figure 4 to that of Figure 5, the welding pressure spring 62 is being further compressed so that the welding pressure transmitted through the lever system to the electrodes and work pieces is increasing even while the welding current is being supplied and after it has been disconnected. This increased pressure serves to squeeze the metal of the work pieces together at the instant that it is heated to the plastic state, and to hold it tightly together for an instant after the current is turned off.

After the spot weld has been completed and the pedal lever 54 has been fully depressed to the position of Figure 5, it is released and the return spring 58, the spring 62, and the resilient secondary coil 33 return all the mechanism to the position shown in Figure 2 whereupon it is ready for actuation to make another spot weld in the same manner. The work pieces are thus clamped and the current turned on and off again all during the downward movement of the pedal lever 54.

The duration of the interval that the switch 66 is closed to supply the welding current is determined by the speed with which the pedal lever 54 is depressed and is thus controlled by the operator and determined by his experience and skill. Usually the time of application of the current is a fraction of a second. It is customary to specify the duration of spot weld current as a welding time in cycles, the usual reference being to a 60-cycle current. For a specified 6 cycle weld time, the contacts would be engaged for a tenth part of a second where the current is 60-cycles. The length of time of the average spot weld is in the range of from 5 to 20 cycles. Where precision welding is required, an electronic counting device can be inserted in the circuit and the switch 66 becomes a pilot switch in the circuit, the electronic timing device serving to time each weld with precision.

By means of the lever and switch system described, a positive sequence of operation is established between the clamping of the work, the application of the welding pressure thereto, the closing of the electric current to apply the welding current, the discontinuation of the welding current, and the release of the welding pressure. It is not possible to apply the welding current until the work pieces have been clamped together with the required welding pressure, and it is impossible to release the welding pressure until after the welding current has been discontinued if the downward movement of pedal lever 54 is continued to the bottom of its stroke.

It is very important that the above mentioned events occur in their proper sequence. If the welding current is applied before there is sufficient pressure between the work pieces or the electrodes and work pieces, there occurs a flash at the electrode points and between the work pieces. Holes are burned into the metal of the work pieces and the electrode points are damaged by having fused metal burned into their faces. If the welding current should still be continued as the welding pressure is being released, the same flash and burned metal results, to an even greater extent. If the sequence of pressure and welding current supply is correct but the welding pressure is insufficient, there is a tendency for the surface of the weld to burn and stick to the points of the electrodes. There is also a tendency for the weld to flash at the interface of the work pieces without making a perfect union.

Another important improvement in my machine is the integral two-turn spot welding secondary and electrode arms which eliminate the losses which otherwise occur when the electrode arms are independent of but electrically connected to the secondary. By the use of my integral unit, the electrical losses are eliminated as well as the costs of providing and machining the fittings by which the electrode arms are attached to the secondary coil.

Figure 6 is a schematic diagram illustrating the theory underlying my integral secondary and electrode arms. The integral unit comprises the secondary coil 33 having two turns, the ends 31 and 32 of which project forwardly and lie in a common vertical plane. The ends form the upper and lower electrode arms so that electrodes, such as shown at 34 and 35 in Figures 2–5, may be attached thereto to extend towards each other. The material of the integral unit shown in Figure 6 is of high electrical conductance such as copper or aluminum, etc. of ample cross-sectional area to carry the large welding current required, having sufficient resiliency so that the two-turn coil 33 may be deformed to bring the ends 31 and 32 towards each other in order to clamp the work between the electrodes, and the ends 31 and 32 should be of sufficient rigidity so that they will not be deformed by the force required to clamp the work. It is apparent that the described construction avoids the electrical losses which would otherwise result when the ends or electrode arms 31 and 32 are separate from the coil 33 but electrically connected thereto, with a flexible connection to allow movement of one arm with respect to the other.

Figure 7 illustrates a practical embodiment of an integral secondary coil and electrode arm illustrated schematically in Figure 7. The structure is a one-piece casting of copper or aluminum or any suitable metal having the required properties of conductivity, strength, and resilience. The two turns of the coil 33 are substantially rectangular in plan but with rounded corners, as shown, the straight portions of the coil and its general shape permitting the most effective utilization of the space within the transformer of which the coil 33 forms a part. The electrode arms 31 and 32 are cast with an I-beam cross-section so that they are very rigid in the vertical plane.

Where the upper electrode arm 31 joins the upper end of the secondary 33, an integral flange 45 is formed for the purpose of attaching the lever 43 previously described in connection with Figure 2. Where the lower electrode arm 32 meets the lower end of the secondary coil, a series of integral bosses 84, 85 and 86 are provided whereby the entire unit may be fixed with relation to a stationary part of the machine as described in connection with the reference numbers 38 and 39 of Figure 2. As also previously described in connection with the schematic diagram of Figure 2, the lever 43 is pivoted about a horizontal transverse axis lying substantially equidistant from the top and bottom and the forward and rear ends of the coil 33. The electrodes 33 and 34 are adjustably secured within bores in the electrode arms by the clamping devices 36 and 37.

When the unit is mounted in the aforesaid manner and the upper electrode arm 31 is moved towards the lower electrode arm, the front parts of the coil move closer together and the turns at the back part of the coil move farther apart. When the electrode arm 31 is raised, the aforesaid relative movements of the coils are reversed. In either case, the movements of the forward and rear portions of the coil turns are about a neutral axis which corresponds to the previously described pivot 44, which is the reason that the pivot 44 has been located at that particular point. Locating the pivot at that point assures maximum movement of the upper electrode arm 31 with the least applied force, and also results in the least movement and stress on the turns of the secondary coil 33.

In order to carry the high welding current required, the cross-section of the metal forming the turns of the coil 33 is quite large. With such a large cross-sectional area, the coil is very stiff and requires a large force to bring the electrodes 33 and 34 together. In order to reduce the amount of force required, the turns forming the coil 33 have been divided into upper and lower sections 87 and 88 separated by a gap 89. Spacing between the upper and lower sections 87 and 88 is maintained by discontinuing the gap 89 in a small region midpoint of the length of the coil and indicated by the reference number 90. The total cross-sectional area of the upper section 87 together with the lower section 88 equals the cross-sectional area required to carry the welding current. At the same time, the force required to deflect the upper electrode arm 31 to bring the electrode points together is only about one-eighth of that required when the turns of the coil are not split. Also, the mechanical stress within the coil 33 caused by the movement of the arm 31 is reduced in substantially the same ratio. In a break-down test, when a unit, as shown in Figure 7, was mounted in the manner described, the unit was subjected to four million full-scale deflections without any failure.

It is to be understood that the cross-section of the metal forming the turns of the secondary coil 33 may be of any other proportion which will give the required electrical and mechanical characteristics. I have found however that the proportions illustrated in Figure 7, with the gap 89, provide the most suitable coil having the required characteristics, and also meeting the requirements imposed by the space limitations of the transformer illustrated in the specific construction shown in Figures 10 to 14, inclusive.

Figure 8:
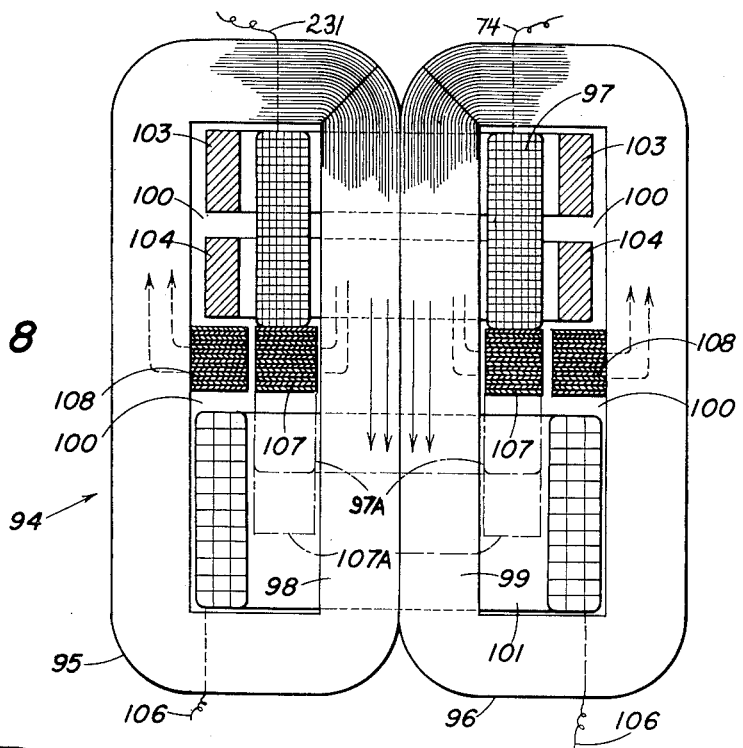
Figure 8 is a diagrammatic representation of one form of dual purpose transformer adapted to be used in a dual welder.

My machine also includes a novel transformer which adapts the machine to be used either for spot welding or for arc welding. My novel transformer affords a simple stepless control for both the spot and the arc welder. Figure 8 illustrates one form of the novel transformer. The transformer core, indicated generally at 94, is of the "shell" or double section type. It comprises two similar sections 95 and 96 placed together as shown. Each section has a central window 100 therein.

The sections 95 and 96 are preferably of the "wound core" type and constructed by the method disclosed in my copending application Serial No. 736,688, filed March 24, 1947, and entitled "Wound core and method of winding."

A transformer primary coil 97 is mounted so as to surround the abutting legs 98 and 99 of the core sections 95 and 96, but it is also mounted so it can be moved vertically within the windows 100 so that it can be shifted from the solid line position shown in Figure 8 to a point where it lies partly within an arc welding secondary coil 101 as indicated by the dotted line position 97A. Indicated at 103 and 104 are the turns of a two-turn spot welding secondary coil which are relatively fixed with respect to the transformer core 94 except for the slight relative movement between the turns to allow the electrode arms 31 and 32 of Figure 7 to move with respect to each other. The movable primary coil 97 is connected to a suitable source of current by flexible leads 74 and 231 and the arc welding secondary coil 101 is connected to the arc welding electrodes by leads 106.

Attached to the bottom of the primary coil 97 for movement therewith and within the windows 100 are a pair of moveable shunt cores 107. In the space in the windows between the spot welder coil and the arc welder coil 101, and attached to each outer leg of the transformer core 94, are a pair of fixed shunt cores 108. The location of the fixed shunt cores 108 is such that they lie in substantially the same horizontal plane as the movable shunt cores 107 when the movable primary coil 97 is at the upper end of its travel, and lying entirely within the turns 103 and 104 of the spot welding secondary coil. While the parts are so proportioned that the movable primary can lie entirely within the spot welding secondary as shown, it is necessary to limit the travel of the primary coil in a downward direction so that only about half of its length will lie within the arc welding secondary 101, or otherwise the arc current would be too great, especially when short-circuited in starting the arc.

When the movable primary coil 97 is entirely within the turns 103 and 104 of the spot welding secondary coil, the movable shunt core 107 is in its nearest position relative to the fixed shunt core 108, and the magnetic leakage through the shunt cores 107 and 108 (indicated by the dotted lines) is at maximum no matter whether current is flowing through the spot welding secondary or through the arc welding secondary 101. However, this maximum leakage across the shunt cores 107 and 108 does not reduce the current flow through the secondary coil turns 103 and 104 because, even though this leakage is at a maximum, it does not cause the magnetic flux lines to avoid the turns 103 and 104. However, if the arc welding secondary 101 is in use, the shunt cores 107 and 108 have the effect of reducing the current in the arc secondary coil 101 to a minimum because the leakage through the shunt cores 107 and 108 causes the leakage magnetic flux to avoid the arc secondary coil 101. Therefore, when the movable primary is in the upper position shown in Figure 8, maximum current flow is induced in the spot welding secondary turns 103 and 104 but a minimum current is induced in the arc welding secondary 101 if that is in use. The control of the current in the arc welding secondary 101 is therefore the combined effect of displacing the primary coil 97 and introducing the movable magnetic shunts 107 and fixed magnetic shunts 108. As the primary coil 97 and the movable shunt core 107 are moved down, the distance between the shunt cores 107 and 108 is increased so that the magnetic leakage is decreased and there results a corresponding increase of the arc current in the secondary 101. The minimum arc current can be made as low as desired by increasing the area of the shunt cores and decreasing the clearance or gap between the fixed shunt and the movable shunt. The maximum arc current may be limited to the maximum rated output of the transformer by limiting the distance the primary coil 97 can enter the arc secondary coil 101. Thus the arc current can be limited to any desired maximum within the rating of the transformer, by the proportion of the shunt cores and the primary coil travel.

When the primary coil 97 is in the raised position shown in Figure 8, the spot welder output is at a maximum, and equal to that of any conventional spot welder of equivalent electrical design, as determined by core and copper sections. It is not necessary to limit the maximum output of a spot welder as is required with an arc welder, and it is desired to obtain the maximum output from a spot welder consistent with its design and rating. As previously pointed out, the leakage between the movable and fixed shunt cores 107 and 108, which is at its maximum when in the solid line position of Figure 8, does not reduce the induced current in the secondary turns 103 and 104 because this leakage does not cause any lines of magnetic flux to avoid the turns of the spot welding secondary.

It is common practice to vary the output of a spot welder by about 2:1, and 3:1 or better in the case of an arc welder. If the primary coil 97 is moved downward until it is about half way inside the secondary 101, the spot welder output is reduced at least fifty percent, which is sufficient for all ordinary purposes. At the same time, the desired range in the output of the arc welding secondary 101 is obtained when the primary coil 97 is moved from one end to the other end of its travel, as described. A single moving element, the primary coil 97 and the attached shunt core 107, therefore provide the full desired range of output for both the spot welding secondary and the arc welding secondary.

Figure 9:
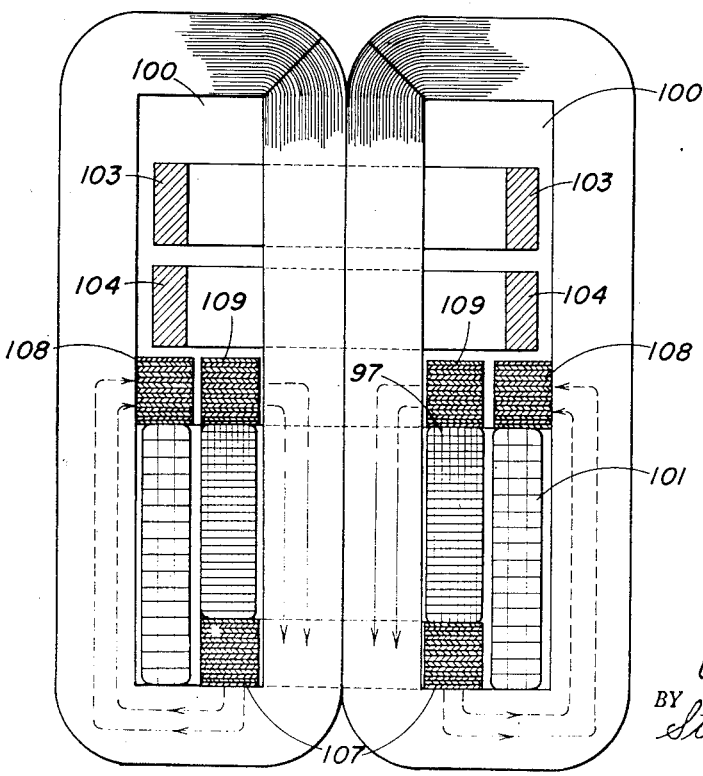
Figure 9 is a diagrammatic representation of another form of dual purpose transformer adapted to be used in a dual welder.

It it is desired to build this transformer so that there is a larger variation in the spot welder output, the construction of Figure 9 can be used. The construction of Figure 9 is similar to that of Figure 8 except that another pair of movable shunt cores 109 have been added to the top of the primary coil 97, and the length of the core window 100 has been increased so that it is possible to move the primary coil downward until the top shunt cores 109 coincide with the fixed shunt cores 108. In this position, the current of the secondary turns 103 and 104 is at a minimum, and the current in the arc welding secondary 101 is at a maximum. When the primary 97 is raised to the top of the stroke so that the movable shunt cores 107 are aligned with the fixed shunt cores 108, then the conditions are reversed. With the additional movable shunt cores 109 added, the output of both the spot welding secondary and the arc welding secondary is variable within wider limits.

It is of course not intended that the spot welder or the arc welder be used simultaneously. Full efficiency is obtained from either, however, when used separately, and any desired output within their rating is obtainable. As mentioned before in connection with Figure 8, the arc current will be too great if the primary is fully inserted into the arc secondary 101, and for that reason the primary coil 97 should not be moved all of the way to the bottom of its travel as shown in Figure 9 when using the arc welder. When the transformer of Figure 9 is designed for use in a dual welder, the addition of the movable shunt cores 109 is intended primarily to extend the range of variation of the output from the spot welder secondary. The transformer of Figure 9 is also adaptable to other uses than as a dual welder transformer. With two secondaries of proper characteristics, it can be used to control the respective output between two circuits so that one increases as the other decreases. It can be used as a load balancing device, or a phase shift control.

The two purpose transformer of Figures 8 and 9 affords an economy of design and efficiency over two single-purpose spot welding and arc welding units. The user has the use of both a spot welder and an arc welder, yet the total connected load and maximum power demand is only equal to the rating of one unit instead of two units. This is important to the user who is restricted by a limitation on his total connected load, or who pays a penalty power rate based on total connected load. The cost of the combined unit is in the range of 50 to 70 percent of the combined cost of two units of conventional design. As a spot welder alone, or as an arc welder alone, the method of current control by a combination moving coil and shunt core results in a core structure considerably shorter and lighter than a core based on a welder transformer whose control is derived solely from a moving coil.

The transformer described in the preceding paragraph is disclosed and claimed in the divisional application Serial No. 123,017, filed October 22, 1949.

Figures 10 to 14 show the details of construction of a dual welder, shown generally in Figure 1 and operative in accordance with the principles explained in connection with Figures 2 to 9. The supporting stand 113 of Figure 1 merely places the welder at such a height that the electrodes 34 and 35 are at a convenient elevation. In order to arrange the actuating lever system for the spot welder so that it can be operated by foot, a foot lever 114 is mounted upon the stand 113 for pivotal movement in a vertical plane, and the lever 114 is connected by a connecting rod 115 (Figures 1 and 10) to the lever 54 of Figure 10 which corresponds to the pedal lever 54 of Figure 2. The lever 54 of Figures 10 to 14 is in two parts 54A and 54B, of which 54B appears in Figure 10. The enclosing cabinet 30 which houses most of the rest of the welder mechanism is fixedly secured to the top of the supporting stand 113, as shown in Figure 1.

Figure 10:
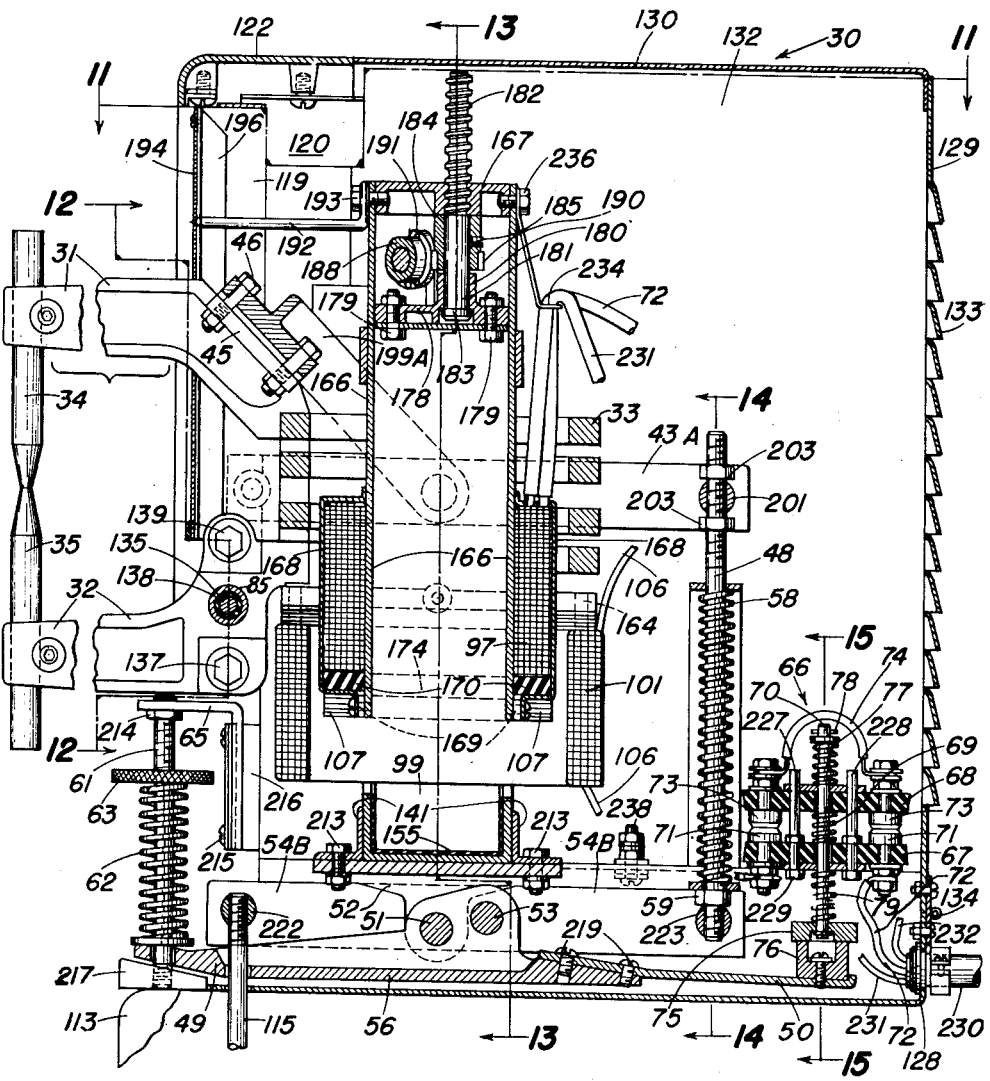
Figure 10 is longitudinal vertical sectional view of the machine of Figure 1, taken substantially along the line 10—10 of Figure 11.
Figure 11:
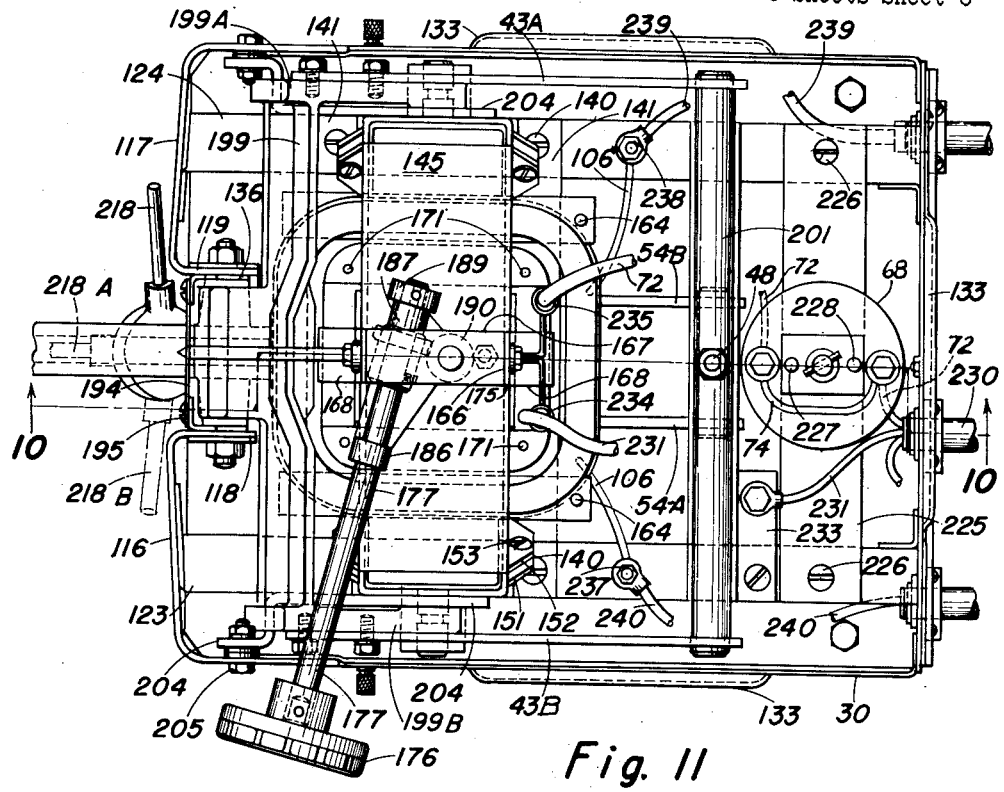
Figure 11 is a horizontal sectional view substantially along the line 11—11 of Figure 10.
Figure 12:
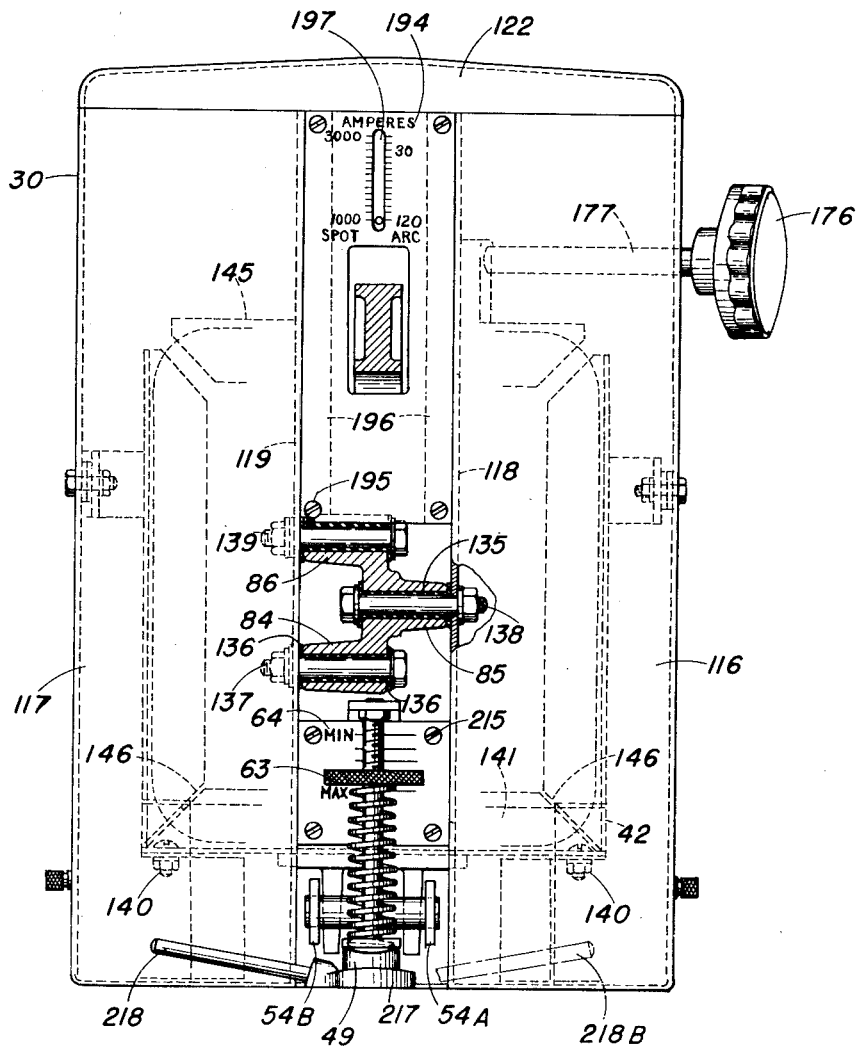
Figure 12 is a transverse sectional view substantially along the line 12—12 of Figure 10 and looking toward the front of the cabinet.

Referring now to Figures 10 to 14, the front of the cabinet is formed by a pair of vertical, substantially channel-shaped members 116 and 117 (Figures 1, 11 and 12) having their inner flanges 118 and 119 spaced from each other as shown in Figures 11 and 12. A series of spaced angle brackets 120 (Figure 13) are welded to the members 116 and 117 at the top thereof. Screws 121 passing through the angle brackets secure a bridging cover member 122 to the top of the spaced channel members 116 and 117.

A pair of horizontal and rearwardly extending channel-shaped members 123 and 124 are welded at their forward ends to the bottoms of the members 116 and 117, and their bottom flange is spot welded to a horizontal bottom wall 125 of the cabinet 30. Along its two sides and behind the members 116 and 117, the wall 125 is extended and bent upwardly to form portions 126 and 127 (Figure 13) of the cabinet side walls. The rear end of the bottom wall 125 is also extended and bent upwardly to the same height as the aforesaid portions 126 and 127, to form a portion 128 (Figure 10) of the cabinet wall. The rear ends of the channel members 123 and 124 are welded to the aforesaid portion 128. The rest of the cabinet structure comprises integral back, top and opposed side wall portions 129, 130, 131 and 132, respectively, as shown best in Figures 1 and 10. Preferably the side and back wall portions 131 and 132 are louvered as indicated at 133 in Figures 10 and 11. A hinge 134 connects the back wall 129 to the top of the back wall portion 128 so that the portions of the cabinet structure formed by the wall 129 to 132 can be swung back about the hinge 134 to provide access to the interior of the cabinet 30.

Thus the channel members 116 and 117, the horizontal channel members 123 and 124, and the bottom wall 125, together with its side extensions, form a rigid structure for housing and supporting the welder mechanism.

Referring to Figures 10, 11 and 12 it will be seen that machine bolts 137, 138 and 139 passing through the bosses 84, 85 and 86, respectively, (see also Figure 7) secure the entire unit shown in Figure 7 between the inner flanges 118 and 119 of the channel members 116 and 117. The entire unit including the spot welding secondary coil 33 with its integral upper and lower electrode arms 31 and 32 is thus supported within the cabinet, the lower arm 32 being fixed and the coil 33 and the upper electrode arm 31 being movable as previously described. The arm 32 is insulated from the bolts 137, etc., by insulating bushings 135 around the bolts, and from the channel flanges by insulating washers 136 (Figures 11 and 12).

Figure 13:
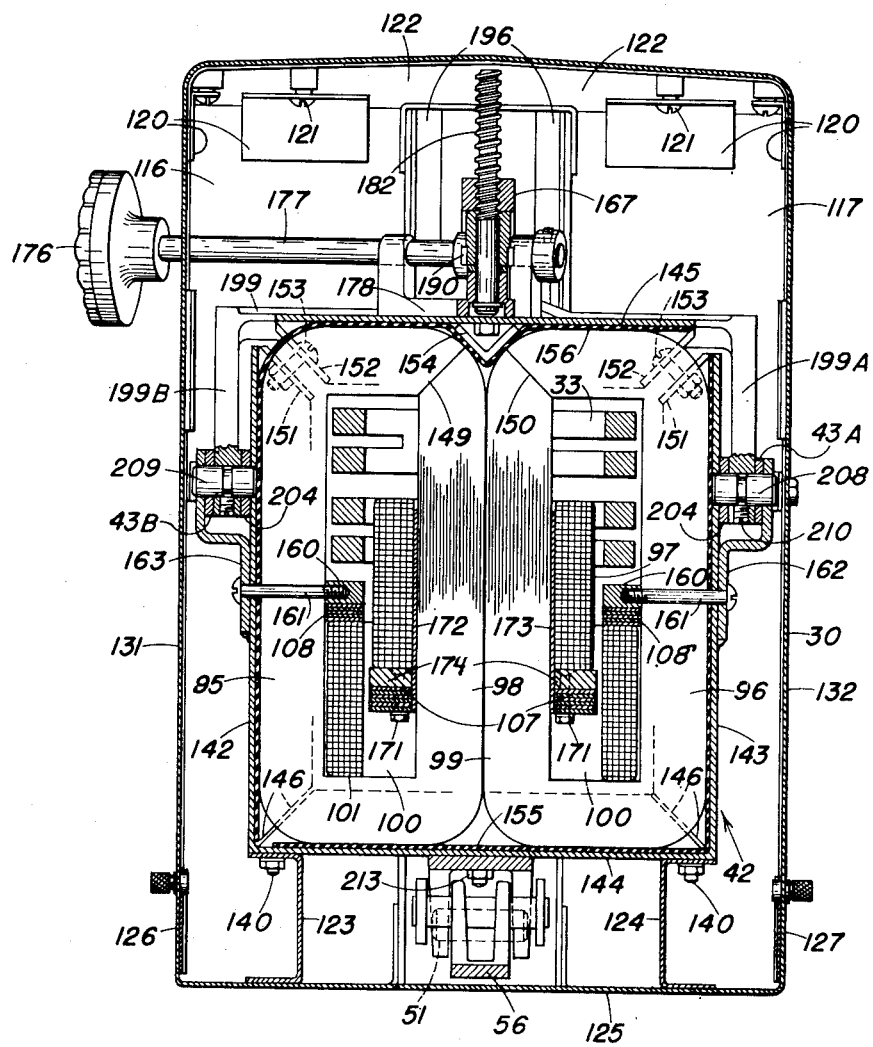
Figure 13 is a transverse sectional view substantially along the line 13—13 of Figure 10.

A transformer core housing 42 (see also Figure 2) is secured by bolts 140 (Figure 11) and angle brackets numbers 141 to the top webs of the channel members 123 and 124. As best shown in Figure 13, the transformer housing 42 is of a two piece construction including a U-shaped bottom member having side legs 142 and 143 with an integral bottom member 144, the U-shaped member being closed on its top by a horizontal transverse top member 145. Both the top member 145 and the U-shaped bottom member are of channel-shaped iron with their flanges extending inwardly. These side flanges have been cut away to allow the U-shaped bottom member to be bent into the form shown in Figure 13 there being only a slight gap remaining between the cutaway portions of the side flanges as indicated at 146, after the bottom member is formed into a U-shape.

A two-piece transformer core of the type illustrated in Figures 8 and 9 is fitted within the housing 42, the two parts of the core being indicated by the reference numbers 95 and 96 of Figure 13. Each of the two cores is of the wound type disclosed in my aforesaid copending application Serial Number 736,688 and the lines 149 and 150 of Figure 13 indicate where the cores have been cut for the purpose of inserting the primary and secondary coils of the transformer around the central leg of the core but between the central leg and the two outer legs as arranged in Figure 13.

The side flanges of the top member 145 adjacent each end thereof and also the side flanges of the side members 142 and 143 adjacent their upper ends are turned outwardly to provide opposed pairs of parallel ears 151 and 152, as shown in Figures 11 and 13. Screws 153 passing through the aforesaid ears serve to clamp the top member 145 against the top of the core parts 95 and 96 to clamp them within the housing 42. Midpoint of the ends of the top member 145 and extending between the flanges thereof is an angle member 154 which may be welded to the top member 145 in the position shown. The angle member 154 is so dimensioned as to enter into the space between the core parts 147 and 148 at the top thereof and serve to assist in keeping them closed at the joining lines 149 and 150.

A relatively thin sheet of fiber insulating material 155 substantially surrounds the assembled core parts 147 and 148, lying between them and the assembled transformer core housing 42. This sheet of insulating material need not be in one piece, but may be of two pieces or more, as indicated at 155 and 156 of Figure 13.

As shown in Figure 13 the arc felding secondary coil 101, previously described in connection with Figure 8, is mounted within the core parts 95 and 96, and surrounding the abutting leg portions 98 and 99 thereof. Both the spot welding secondary coil 33 and the secondary coil 101 are in vertical alignment about the abutting legs 98 and 99 and provide a central passageway for the movement of the vertically shiftable primary coil 97 previously described in Figure 8. All of the coils are inserted within the transformer core at the time that the two core parts 95 and 96 are spread apart at their adjoining lines 149 and 150 in the manner described in my aforesaid copending application.

As previously described, the spot welding secondary coil 33 is not supported by the transformer core housing 42 but by the bolts 137, 138 and 139 and the flanges 118 and 119, as best shown in Figure 12. The arc welding secondary coil 101 however is retained in place within the housing 42 by means of two fixed shunt cores 108 best shown in Figures 13 and 10. The shunt cores 108 are each composed of a series of thin strips of metal in the conventional manner, but the top strips 160 are of substantial thickness so as to receive the threaded ends of machine screws 161 to secure the coil 101 and the shunt cores 108 within the housing. As shown in Figure 13 the screws 161 pass through the outer walls of the core parts 95 and 96, through the side members 142 and 143 of the housing 42 and through the brackets 162 and 163 which are welded to the exterior of the side members 142 and 143. Thus the secondary coil 101 is held in position at the bottom of the windows 100 in the core parts by means of the fixed shunt cores 108 which are in turn held in place by the screws 161. The secondary coil 101 is secured against shifting in a horizontal plane by means of locating pins 164 adjacent the ends of the shunt cores 108 and which protrude vertically downwardly therefrom to engage the outer surface of the core 101 at four equally spaced points adjacent to the top thereof.

The movable primary coil 97 is secured to a pair of vertically extending slide members 166 (Figures 10 and 11) which are connected together at their upper ends by a yoke 167. The primary coil 97 is wound in a substantially square form so that its windings parallel as closely as possible the substantially square cross sections of the abutting legs 98 and 99 of the two core parts 95 and 96. The two slide members 166 lie between two diametrically opposed portions of the primary coil 97 and the front and rear surfaces of the abutting legs 98 and 99 of the core parts 95 and 96, and the primary coil 97 is secured to the slide members 166 by a pair of straps 168 (Figure 10) which may be secured at their upper ends to the slide members 166 as by welding, and may be secured at their lower ends to the same slide members as by screws 169.

Also clamped within the straps 168 but below the primary coil 97 are a pair of transversely extending blocks 170 of insulating material such as Bakelite or the like. The blocks 170 have attached thereto at their end portions, by the screws 171 the movable shunt cores 107 previously described in connection with Figure 8. In Figures 10 and 13 the movable primary coil 97 is at the bottom of its stroke corresponding to its position as shown at 97A in Figure 8. When it is raised to the upper end of its stroke the movable shunt core 107 will be directly in line with the fixed shunt cores 108 as is shown in the solid line position in Figure 8.

The forward and rear portions of the primary coil 97, as viewed in Figure 10, are spaced from the abutting central legs 98 and 99 of the core portions by the sliding members 166. In order to prevent engagement of the primary coil 97 with the right or left hand faces of the abutting sections 98 and 99 as viewed in Figure 13, metallic wear liners 172 and 173 (Figure 13) are provided between the movable coil 97 and stationary legs 98 and 99 of the core parts. Each liner is secure to the primary coil 97 for movement therewith by reason of the fact that it is spot welded to one of the relatively thick top strips 174 of the laminated movable shunt core 107 before the primary coil is assembled to the movable shunt core.

If it is desired to include a second pair of movable shunt cores as shown in Figure 9, the transformer core parts 95 and 96 will be slightly longer so that the windows 100 therein will be slightly longer as described in connection with Figure 9. The additional movable shunt cores 109 will then be secured to the top of the movable primary coil in the same manner and by the same straps 168 shown in Figure 10.

The movable primary coil 97 with its associated shunt core elements 107 and the slide members 166 which carry them move up and down within the windows 100 are raised or lowered by turning a knob 176 which is suitably affixed as by a set screw to the outer end of a horizontal rotary shaft 177 which protrudes through the side wall of the cabinet 30.

The casting 178 (Figures 10, 11 and 13) is secured to the top surface of the removable top member 145 of the transformer core housing 42 as by means of bolt 179 (Figure 10). The previously described slide members 166 extend through slots 175 provided for their passage in the said top member 145 and the slide members protrude a substantial distance above the top member 145 where their upper ends are connected by the previously described yoke 167. The casting 178 has an upwardly extending hollow boss 180 which supports and journals for rotation a vertical shaft 181 having worm threads 182 along its upper end.

The worm threads 182 have a mating engagement with a threaded bore in the yoke 167 so that when the shaft 181 is rotated, it will raise or lower the yoke 167 in accordance with the direction of rotation of the shaft. The shaft 181 is enlarged at its bottom at 183 to keep it from moving upwardly within the boss 180. Axial movement in the other direction is prevented by a collar 184 which is affixed to the shaft in any suitable manner as by a set screw 185 threaded through the collar and seating in a recess in the shaft 181. The casting 178 has formed integrally therewith a pair of upwardly extending bosses 186 and 187 (Figure 11) which journal the rotary shaft 177 for rotation. Axial movement of the shaft is prevented by collars 188 and 189 disposed on opposite sides of the boss 187 and suitably affixed to the shaft as by set screws. As shown in Figures 10 and 11, the collar 184 on the vertical shaft 181 has integral therewith the helical worm gear 190. The collar 188 on the horizontal shaft 177 has integral with it the helical worm gear 191 which has a meshing engagement with the helical gear 190. Rotation of the external knob 176 therefore rotates the horizontal shaft 177 to raise or lower the yoke 167 to adjust the vertical position of the movable primary coil 97 and the movable shunt or shunts carried thereby. There is sufficient friction between the relatively moving parts so that the position of the movable primary coil cannot be disturbed except by rotation of the knob 176.

An indicator pointer 192 is secured to the front of the yoke 167 by the screw 193 so that it moves up and down with the yoke in accordance with the position of the primary coil. The indicator pointer 192 extends to the front of the cabinet where it protrudes through an indicator scale plate 194 which is secured by screws 195 to a pair of angle brackets 196 welded to the inner surfaces of the inner flanges 118 and 119 on the channel members 116 and 117. The indicator scale plate 194 (Figure 12) has an opening 197 through which the pointer 192 protrudes so that it can be read in connection with either of the two scales on the opposite sides of the vertical slot 197. The scale on one side of the slot is graduated in terms of amperes of output for the spot welder, and on the other side is graduated in terms of amperes of output of the arc welder.

Thus as we have described in connection with Figures 8 and 9 the maximum spot welding output current will be obtained when the primary coil 97 is at the upper end of its stroke, and the minimum spot welding current will be obtained when the coil is at the bottom end of its stroke. At this latter position the maximum arc welding current is obtained. Therefore the particular scale on the plate 194 that will be read in connection with the pointer 192 will depend upon whether the spot welder is being used or whether the arc welder is being used.

The lever mechanism which actuates the electrode arms 31 and 32 to clamp the work pieces between the electrodes, and to sequentially supply and disconnect the current to the transformer primary, will now be described.

In Figure 2, the lever 43 is shown as a single lever but the corresponding lever in the illustrated embodiment of Figures 10 to 14 comprises two spaced and parallel levers 43A and 43B on opposite sides of the transformer housing 42. At their forward ends, the levers 43A and 43B are secured as by cap screws 198 to a transverse casting 199 which forms a yoke to connect them together at their forward ends. Midpoint of its length, the transverse casting 199 is provided with a flange 200 which has a mating engagement with the flange 45 on the inner end of the upper electrode arm 31, and to which it is secured by the screws 46.

Figure 14:
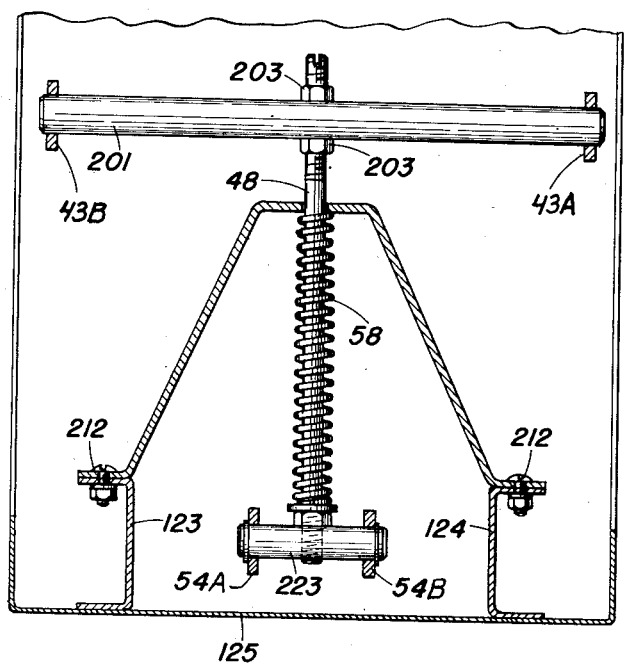
Figure 14 is a transverse sectional view substantially along the line 14—14 of Figure 10.

The rear end of the arms 43A and 43B are connected together by a transverse rod 201 which is rotatable therein to form the pivoted connection identified as 47 in Figure 2, the push rod 48 passing through the transverse rod and being fixedly but adjustably secured thereto by the two nuts 203 (Figure 14).

The two side members 142 and 143 of the transformer core housing 42 are further secured in vertical position and reinforced by a pair of braces 204 (Figure 11) which are welded to the members and extend forwardly where they are secured by bolts 205 to the outer webs of the channel members 116 and 117 which form the forward part of the cabinet 30. As shown in Figure 13 the brackets 162 and 163, with the braces 204, and the side members 142 and 143, on each side of the transformer core housing, are bored to receive pivot pins 208 and 209. These pins correspond to the pivot 44 of Figure 2, and their common axis is transverse of the spot welding secondary coil 33 and midpoint of its height and fore and aft dimension, as described in connection with Figure 2. Pin 208 passes through the lever 43A and the corresponding leg 199A of the transverse casting 199. The pin 208 may be secured against axial movement by a screw 210 in the leg 199A engaging a central peripheral groove in the pin 208. The other lever 43B and associated casting leg 199B are similarly pivotally mounted upon the transformer core housing by the pin 209. It is thus apparent that the system of elements including the rod 201, levers 43A and 43B and the transverse casting 199 correspond to the lever 43 of Figure 2, except that it is bifurcated to go around the transformer core housing 42, the sole difference being the details of a practical welder as compared to the diagrammatic drawing of Figure 2.

Referring to Figures 14 and 10, the push rod 48 is journalled for sliding movement through an inverted V-shaped member 211 which is secured at its lower ends to the channel members 123 and 124 by screws 212. The V-shaped member corresponds to the fixed member 60 of Figure 2, and thus forms the upper stop for the coiled return spring 58 through which the push rod 48 passes.

A fixed support 52, corresponding to the one shown at 52 in Figure 2, is secured to the underside of the angle bracket members 141 (Figure 10) by bolts 213 (Figure 13) in transverse alignment with the bolts 140 (Figure 11) which fasten the same angle bracket members to the tops of the channel members 123 and 124. The support is bifurcated as shown in Figure 13 and holds the pin 51 corresponding to the pivot 51 of Figure 2.

The pressure lever 56 has a central portion which is U-shaped in cross section as shown in Figure 13, with its legs extending between the legs of the bifurcated support 52 and journalling the lever for rotation upon the pin 51. At its forward end its leg 49 is bored to pass the pressure spring rod 61 which mounts the welding pressure spring 62 and is threaded into a fixed bracket 65 and locked thereto by a nut 214. Adjustment of the welding pressure spring is by the enlarged knurled nut 63 threaded onto the rod 61 and the welding pressure is indicated by the vertical position of the nut 63 with respect to a scale on a plate 64. The plate 64 is attached by screws 215 to a pair of brackets 216 affixed to the inner webs 118 and 119 of the vertical channel members 116 and 117, and the bracket 65 is carried by the plate 64, being spot welded thereto.

A cam member 217, having an inclined upper surface, is suitably attached as by threading, to the lower end of the pressure rod 61 so as to be rotatable about the axis of the rod, and is rotatable by means of an attached handle 218 (Figure 12) for a purpose to be described.

The rear leg 50 of the pressure lever 56 is attached to the lever by screws 219, and at its rear end it carries the magnet 76. To the rear of the pin 51 the legs of the U-shaped portion of pressure lever 56 carry the pivot pin 53 corresponding to the pivot 53 of Figure 2. In the illustrative embodiment of Figures 10 to 15, the pedal lever 54 of Figure 2 is in the form of two parallel spaced bars 54A and 54B (Figures 12 and 13) which straddle the bifurcated fixed support 52 and are pivotally attached to the pressure lever 56 by the pivot pin 53. The two spaced bars 54A and 54B are connected at their forward ends by a rod 222 into which the upper end of the connecting rod 115 is threaded, to connect the parallel bars 54A and 54B to the foot lever 114 of Figure 1. At their rear ends the parallel bars 54A and 54B are connected by a rod 223 into which the lower end of the push rod 48 is threaded. The return spring adjusting nut 59 is threaded onto the push rod and can be turned to vary the compression in the return spring 58 which is confined between the nut and the V-shaped member 211.

Figures 10 and 11 show the details of construction of the switch 66 described in connection with Figure 2 for controlling the supply of current to the primary coil 97 of the transformer during spot welding operations. The lower insulating support member 67 is fixedly secured to a cross piece 225 which is attached to the top of the channel members 123 and 124 by screws 226 as shown in Figure 11. A pair of diametrically spaced guide pins 227 and 228 extending vertically through the insulating member 67 and the cross piece 225 clamp these two elements together by means of the nuts 229 threaded onto the guide pins. The guide pins 227 and 228 also pass through the upper insulating support member 68 to guide it in its vertical movements towards and away from the insulating support member 67. The compression spring 69 urges the insulating support member 68 to its upper position. The pair of contacts 71 mounted upon the insulating member 67 are in position to be engaged by the contacts 73 carried by the insulating member 68 when that member is pulled to the bottom of its stroke in the manner described in connection with Figure 2. The vertical rod 70 which carries the pole piece 75 at its bottom passes through both of the insulating members 67 and 68 with a sliding fit and is urged towards the upper end of its stroke with respect to the upper member 68 by the compression spring 77, which is retained thereon by the pin 78. The bumper spring 79 between the pole piece 75 and the lower insulating member 67 cushions the rapid upward movement of the rod 70 when the pole piece 75 is released by the magnet 76 during the course of a normal spot welding sequence of operation.

This sequence of operation is exactly the same as that described in connection with the schematic diagram of Figures 2 to 5, and therefore need not be repeated here.

In Figures 10 and 11, the supply current leads 72 and 231 are shown entering the cabinet through a cable fixture 230. A ground wire 232 comes in through the same fixture and is grounded to any part of the cabinet. The lead 231 is secured within the cabinet to an insulating block and terminal 233 (Figure 11) and then continues upwardly where it passes through a hook 234 and downwardly within the spot welding secondary coil 33 where it is connected to the primary coil 97. The other lead 72 is connected to one of the fixed contacts 71 on the switch 66. The upper and movable contacts 73 are connected together by the lead 74. The circuit of lead 72 continues from the opposite fixed contact 71 to the flexible lead 72 (Figure 11) extended thru the wire clamp 234 and terminating in the other end of the primary coil 97. The hooks 234 and 235 are integral parts of a formed wire which is connected to the yoke 167 by a screw 236 so that the hooks 234 and 235 move upward and downward together with the movable primary coil 97 and its associated elements, so as to support and guide the flexible leads 231 and 72 as the primary coil is moved vertically.

The two flexible leads 106 from the arc welding secondary coil 101 are connected to insulated binding posts 237 and 238, and the arc welding leads 239 and 240, (Figures 11 and 1) connected to the same binding posts, pass through suitable fittings in the back of the cabinet. The arc welding lead 239 has an electrode holder 241 at its end as shown in Figure 1, and the other lead 240 may be provided with a clamp (Figure 1) for attachment to the work in the conventional manner.

The cam member 217 underneath the forward end of the pressure lever 56 is rotatable through slightly less than 180 degrees. When its handle is in the solid line position 218 of Figure 11 the cam 217 does not interfere with the free operation of lever 56.

When the cam member 217 is rotated by the handle 218 through an angle of 90 to 120 degrees so that the handle 218 extends forwardly of the machine as indicated by the dotted line position 218A of Figures 10 and 11, its inclined upper surface engages the underside of the forward leg 49 of the pressure lever 56 and rotates the lever 56 in a clockwise direction as viewed in Figure 10. The clockwise rotation of the lever 56 is sufficient for the magnet 76, which is engaging the pole piece 75, to pull the rod 70 downwardly and to engage the fixed contact 71 with the movable contacts 73 to close the circuit to the movable primary coil 97. This places the apparatus in condition so that it can be used for arc welding, because as soon as the electrode in the electrode holder 241 engages the work piece which is connected to the other arc welding lead 240, an arc welding current will flow through the arc welding secondary coil 101. The circuit to the movable primary coil 97 has thus been closed by moving the handle 218 on cam 217 to the position 218A instead of by depressing the foot lever 114 of Figure 1. Since the foot lever 114 has not been depressed, the electrodes 34 and 35 carried by the arms 31 and 32 on the spot welding secondary coil 33 remain in their open position as shown in Figures 1 and 2, and no current flows through the spot welding secondary 33.

When the cam 217 is rotated through a further angle of 90 degrees so that the handle 218 is in the position shown at 218B in Figures 11 and 12, the inclined upper surface of the cam 217 rotates the lever 56 clockwise through a further angle so that the rod 70 reaches the bottom end of its stroke and is disengaged from the magnet 76 whereby the compression spring 69 returns the upper insulating support member 68 to its upward position to disengage the contacts 71 and 73. When the handle is returned to the original position 218, the lever 56 is returned to its original position, the switch 66 is opened, the transformer is no longer continuously energized as for arc welding, and the unit may be used as a spot welder without further change.

When the contacts 71 and 73 have been opened by the disengagement of the magnet 76 from the pole piece 75 by turning the handle 218 to the position 218B, it is not then possible to re-engage the contacts 71 and 73 to supply current to the primary coil 97 by depressing the foot lever 114, and so the machine is effectively disconnected from its source of power supply so that no one could be injured by tampering with the machine, as for instance, by depressing the foot lever 114. The reason that the contacts 71 and 73 cannot be engaged when the cam 217 is so positioned, is that since the upward inclined surface of the plate 217 has pushed the pressure lever 56 clockwise, it acts as a stop to prevent its rotation in the other or counterclockwise direction, and because of this mechanical stop so provided, the lever 56 cannot be rotated in the counterclockwise direction to close the switch 66, even by depressing the foot lever 114.

It will be apparent that my improved dual welder provides a compact unit which may be used either for spot welding or for arc welding as desired, and although there are two welders connected to the supply circuit, the maximum connected load will only be that of only one welder.

In the illustrated embodiment this will be the spot welder since it has a greater output and requires more connected power than does the arc welder.

While I have illustrated a combined spot welder and arc welder, it is to be understood that either one or the other may be eliminated from the machine. If the machine is to be used as a spot welder only, it is not necessary to provide the arc welding secondary coil 101 and its output leads 239 and 240. When these elements are eliminated, however, the spot welder still has a continuously variable output by adjusting the vertical position of the primary coil 97 by rotation of the knob 176. When so used as a spot welder, the combined lever system and switch 66 for the primary coil 97 illustrated in Figure 10 is still used.

When the unit is intended solely for use as an arc welder, however, the integral spot welding secondary coil 33 and its electrode holding arms 31 and 32 are not used, and the lever system which closes the electrodes and actuates the switch of Figure 10 is similarly not used. In this case, the movable primary coil 97 and movable shunt 107 still affords a continuously variable current control from minimum to maximum by rotating the knob 176.

I have therefore provided a new and improved combination spot welding and arc welding unit which may be selectively used for either purpose, and wherein the output current for either purpose is continuously variable between their designed limits. I have provided a novel combined lever and switch system to insure that the welding current is not supplied to the spot welder electrodes until the proper welding pressure has been applied to the work pieces, said system also insuring that the welding pressure is not reduced before the welding current is disconnected. In cooperation with the novel lever and switch mechanism, the rotatable cam 217 provides a novel means whereby the switch 66 in the circuit of the movable primary may be selectively used to supply an energizing current only for an instant during spot welding or whereby the same switch may be used to supply a continuous current during arc welding. The same cam also provides a safety device to prevent the energizing of the welding transformer by any one tampering with the machine or inadvertently depressing the foot lever 114.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a welding unit adapted to be used selectively for spot welding or for arc welding comprising, a transformer having a primary winding and secondary windings for spot welding and arc welding respectively, a switch in the supply line to said primary winding, a pair of electrode arms, at least one of said arms being movable toward the other to clamp work pieces between the electrodes carried thereby, a first lever connected to move said movable arm, a second lever having a pivotal connection to said unit, said first lever being pivotally mounted upon said second lever at a point longitudinally spaced from and parallel to said pivotal connection of said second lever, resilient means opposing movement of said second lever, whereby said first lever pivots about said second lever to clamp the work pieces during spot welding, means connecting said switch to said second lever, whereby pivotal movements thereof of a certain amount effect closing of said switch and movements of a greater amount effect opening of said switch, said second lever being pivoted to effect closing and opening of said switch by pivotal movements of said first lever for spot welding, and further means for pivoting said second lever to close said switch for arc welding, said further means being effective to pivot said second lever further to effect opening of said switch and to prevent operation of said switch by said first lever.

2. In a spot welding machine, a pair of electrode arms, at least one of said arms being movable toward the other to clamp work pieces between the electrodes carried thereby; a first lever connected to move said movable arm; a second lever having a pivotal connection to said machine, said first lever being pivotally mounted upon said second lever at a point longitudinally spaced from and parallel to said pivotal connection of said second lever; and resilient means opposing movement of said second lever, whereby said first lever pivots about said second lever to clamp the work pieces, and then pivots about said pivotal connection to the machine to apply welding pressure to the work pieces.

3. In the machine described in claim 2, means for adjusting the welding pressure applied to the work by controlling the initial resistance of said resilient means.

4. In the machine described in claim 2, a switch operable to supply electrical current to the machine; means connecting said switch to said second lever, said means being effective to move said switch to closed position and to release said switch during the resiliently opposed movement of said second lever, and means for opening said switch after said release.

5. In the machine described in claim 2, a normally open switch connected to supply electrical current to the machine when closed; resilient means opposing movement of said switch towards closed position; and magnetic means coupling said switch to said second lever whereby said switch is moved to closed position and then released during the movement of said second lever, and means for opening said switch after said release.

6. In a welding machine, a fixed transformer core; a resilient and deformable spot welding secondary coil on said core; said coil being deformable transversely to the planes of the coil turns; electrode arms integral with and protruding from said coil; means fixing said coil with respect to said core at a point where an arm joins said coil; and means for moving the other arm towards said fixed arm to clamp work pieces therebetween; said last mentioned means comprising a lever connected at one end of the movable arm, said lever being pivoted about an axis perpendicular to the plane containing said electrode arms and lying midpoint of the height and width of said coil.

7. In a welding machine, a fixed transformer core, a housing therefor; a resilient and deformable spot welding secondary coil on said core; said coil being deformable transversely to the coil turns; electrode arms integral with and protruding from said coil; means fixing said coil with respect to said core at a point where an arm joins said coil; and means for moving the other arm towards said fixed arm to clamp work pieces therebetween, said arm moving means comprising a lever connected to said other arm and pivotally mounted upon said housing about an axis perpendicular to the plane containing said electrode arms and lying midpoint of the height and width of said coil.

8. In a welding machine, a fixed transformer core, a housing therefor, a resilient and deformable spot welding secondary coil on said core; said coil being deformable transversely to the planes of the coil turns; electrode arms integral with and protruding from said coil; means fixing said coil with respect to said core at a point where an arm joins said coil; and means for moving the other arm towards said fixed arm to clamp work pieces between the electrodes attached to said arms, said arm moving means comprising a lever rigidly connected to said other arm adjacent the point where it joins the coil, and pivotally mounted upon said housing about an axis perpendicular to the plane containing said electrode arms and lying midpoint of the height and width of the coil.

9. A spot welding transformer element comprising a resilient secondary coil of high conductance metal terminating at its ends in a pair of rigid electrode arms integral with said coil; and means where one of said arms joins said coil for fixedly attaching the element to a support.

10. A spot welding transformer element comprising a resilient secondary coil of high conductance metal; a pair of electrode arms rigidly attached to said coil; and means adjacent where one of said arms is attached to the coil for fixedly attaching said element to a support.

11. A spot welding transformer element comprising a resilient secondary coil of high conductance metal; a pair of electrode arms rigidly connected to said coil at the ends thereof; means where one of said arms joins said coil for fixedly attaching the coil to a support; and means where the other arm joins the coil providing a connection for means operable to deform the coil to move said arms towards each other against the force provided by the resilience of the coil.

12. A spot welding transformer element comprising a resilient secondary coil of high conductance metal terminating at its ends in a pair of rigid electrode arms integral with said coil; means where one of said arms joins said coil for fixedly attaching the element to a support; and means where the other arm joins said coil providing a connection for means operable to move said other arm towards the first arm.

13. A spot welding transformer element comprising a resilient secondary coil of high conductance metal terminating at its ends in a pair of electrode arms extending radially outward from the coil and integral therewith, the turns forming said coil being split to reduce the stress therein per unit of deflection.

14. A spot welding transformer element comprising a resilient secondary coil of high conductance metal, having means by which the coil can be fixedly supported at a point adjacent one end thereof, the turns forming said coil being split to reduce the stress therein per unit of deflection when the coil is deflected while in use.

15. A spot welding transformer element comprising a resilient secondary coil of high conductance metal, having a plurality of turns and terminating at its ends in a pair of rigid electrode arms integral with said coil; and means where one of said arms joins said coil for fixedly attaching the element to a support.

ULYSSES S. DUNN.

REFERENCES CITED

The following references are of record in the file of this patent:

UNITED STATES PATENTS

| Number | Name | Date |
|---|---|---|
| 452,042 | Ries | May 12, 1891 |
| 1,086,042 | Gravell | Feb. 3, 1914 |
| 1,145,413 | Hatch | July 6, 1915 |
| 1,312,845 | Gravell | Aug. 12, 1919 |
| 1,506,698 | Waters | Aug. 26, 1924 |
| 1,519,062 | Schroder | Dec. 9, 1924 |
| 1,548,397 | Taylor | Aug. 4, 1925 |
| 1,674,670 | Taylor | June 26, 1928 |
| 1,986,512 | Meadowcraft | Jan. 1, 1935 |
| 1,988,537 | Breguet | Jan. 22, 1935 |
| 2,170,700 | Von Henke | Aug. 22, 1939 |
| 2,254,309 | Perry | Sept. 2, 1941 |

FOREIGN PATENTS

| Number | Country | Date |
|---|---|---|
| 117,601 | Switzerland | Nov. 16, 1926 |